United States Patent [19]
Aldenhoven

[11] 4,162,756
[45] Jul. 31, 1979

[54] AUTOMATIC STOP MECHANISM

[75] Inventor: Ghislanus M. A. M. Aldenhoven, Eindhoven, Netherlands

[73] Assignee: U.S. Philips Corporation, New York, N.Y.

[21] Appl. No.: 849,024

[22] Filed: Nov. 7, 1977

[30] Foreign Application Priority Data

Nov. 11, 1976 [NL] Netherlands .................... 7612510

[51] Int. Cl.² ......................................... B65H 25/32
[52] U.S. Cl. ........................................ 226/43; 226/45; 226/174; 226/181
[58] Field of Search ............... 74/2, 3.5, 814; 226/11, 226/25, 37, 43, 45, 181, 186, 187, 174, 178; 242/186

[56] References Cited
U.S. PATENT DOCUMENTS

| | | | |
|---|---|---|---|
| 3,620,429 | 11/1971 | Kozu | 226/11 |
| 3,737,085 | 6/1973 | Suzuki | 226/11 |

FOREIGN PATENT DOCUMENTS 2332475  1/1975  Fed. Rep. of Germany ............. 226/11

*Primary Examiner*—Richard A. Schacher
*Attorney, Agent, or Firm*—David R. Treacy

[57] ABSTRACT

An automatic stop or change-over mechanism for tape recorder or other article moving apparatus. After the article has stopped at the sensing location the drive means can be switched off or changed over automatically by movement of a zero member which is part of a differential mechanism having a unidirectional slip coupling. The slip coupling only transmits a force to the zero member after the article has stopped.

10 Claims, 6 Drawing Figures

4,162,756

AUTOMATIC STOP MECHANISM

BACKGROUND OF THE INVENTION

1. Field of the Invention

The invention relates to mechanisms for initiating a control function responsive to local interruption of movement of an article along a path, such as an automatic interruption mechanism which is suitable for a magnetic tape apparatus for recording and/or reproducing signals on a moving magnetic tape (hereinafter referred to as a tape recorder stop mechanism); and more particularly to a tape recorder having a capstan for transport of the magnetic tape with an accurately defined speed, rotatable about a first axis of rotation and while driving the magnetic tape; a pressure roller which co-operates with the capstan and is rotatable about a second axis of rotation which is parallel to the first axis of rotation; means for driving the capstan; and a stop mechanism which, after being activated, automatically interrupts the drive of the magnetic tape when the tape comes to a standstill, at least locally.

More generally, apparatus for which such mechanisms are useful have:

(a) a first rotatably driven component which during operation of the apparatus performs a rotary movement and also keeps rotating after the article such as a tape has come to a local standstill at least during the time which is necessary for the activation of the interruption or other control mechanism, (b) a second rotatable component, which during operation of the apparatus performs a rotary movement only during normal transport of the article such as tape and whose stoppage constitutes a signal for the control function that the article has come to a local standstill, (c) a differential mechanism, including a slip coupling, primary and secondary coupling sections which are rotatable relative to each other and which are rotable with given transmission ratios by the first and second rotatable components, and a zero member movable in a first and also in a second direction of movement and biased toward one direction, these directions of movement being dependent on the difference in speed of rotation of the rotary movements (the slip) between the primary and secondary coupling sections; and each of the coupling sections being so driven and the zero member being so loaded that during transport of the article the zero member is continuously subjected to a force in its first direction of movement while during local interruption of article movement the zero member is driven in its second direction of movement, (d) stop means which limit movement of the zero member in its first direction of movement, and (e) a control device such as a switching system which is engaged by the zero member for turning off the apparatus drive after the zero member has moved in its second direction of movement.

There is a growing interest on the part of consumers in the presence of an automatically operating mechanism which interrupts or switches off the apparatus when the end of a magnetic tape is reached, in particular in the case of magnetic-tape cassette equipment. In cassette equipment which is suitable for playing back the cassette in both directions the drive means may be changed over automatically after the interruption, so that automatically continued reproduction of a program in the cassette is possible. In equipment which is not suitable for automatic change-over of the direction of movement the interest in an automatic stop feature for the apparatus mainly arises from the wish to prevent unnecessary wear and possible damage to the magnetic tape and, in the case of a battery-powered units, running the batteries down.

2. Description of the Prior Art

In known automatic interruption mechanisms of the type mentioned above the first rotatably driven component during operation and which also keeps rotating after the local stoppage of the tape transport, generally consists of a spindle such as a capstan which is driven directly by a drive motor. The second rotatable component, which rotates only during tape transport and whose stopping constitutes a signal that the tape has come to a local standstill, is generally constituted by a reel disc or a pressure roller.

When the switching mechanism responds to stoppage of the rotation of a reel disc, this does not necessarily mean that the magnetic tape has come to a standstill in other parts of the apparatus at the same time. For example, stoppage of the turntable may be the result of jamming of a take-up reel. If that occurs and the magnetic-tape transport continues at the location of the capstan continues, loops are formed in the magnetic tape in the cassette, so that the magnetic tape and the cassette, may be damaged.

When pressure roller speed is sensed, and the switching mechanism responds to stoppage of the magnetic tape at the location of the capstan, the pressure roller should have a width which is smaller or not much greater than the width of the magnetic tape, because otherwise the pressure roller is likely still to be driven by the capstan after the magnetic tape has come to a standstill.

An interruption mechanism of the first type is known from German Patent Specification No. 1,286,773. In this known interruption mechanism two central or sun gear wheels of a planetary gear arrangement are journalled on a spindle. The zero member consists of a lever pivotally journalled at one end about the same spindle and carrying two planet wheels at its free end, each engaging a respective sun gear. One of the two sun gears is driven by a capstan through an intermediate gear wheel, the other central or sun gear being driven by a reel disc, which in its turn is driven by a drive motor, through a friction coupling. The sun gear spindle is mounted on a pivotable lever. The transmission ratio of the planet wheels has been selected so that even at the lowest speed of the reel disc the central gear wheel which is driven thereby pushes the zero lever against a stop in its first direction of movement, which is accompanied by slippage in the friction coupling. When the speed of the reel disc becomes zero because the end of the magnetic tape has been reached, the zero member is moved in its second direction of movement and thus opens a contact, so that the current supply to the drive motor is discontinued.

An interruption mechanism of the second type is known from German Offenlegungsschrift No. 2,332,475. In this mechanism the primary coupling section consists of a spindle which is parallel to the capstan, the spindle circumference being resiliently pressed against the pressure roller. The pressure roller then serves as secondary coupling section, the slip between the coupling sections occurring between the circumference of the pressure roller and the circumference of the primary coupling section. The primary coupling section is journalled the zero member, which is in a U-shaped bracket pivoted near the end of its limbs about an axis in line with the axis of rotation of the pressure roller. On the capstan a gear pinion is located which, via an idler wheel, drives a gear wheel mounted on the primary coupling section, with a 1:1 transmission ratio. The diameter of the primary coupling section has been selected so that during transport of the tape the primary coupling section has a slightle lower circumferential speed than the pressure roller. The slip between these two components results in a frictional force which presses the U-shaped bracket, or zero member, against a stop. As soon as the magnetic tape comes to a standstill, the pressure roller also stops. The capstan, however, continues to rotate so that the primary coupling section also remains driven. As a result of this the spindle performs a rolling movement over the circumference of the pressure roller, so that the zero member is moved in its second direction of movement and moves a catch so that the catch comes within range of a cam which is mounted on a flywheel which is coupled to the capstan. The cam exerts an impact force on the catch, so that a latching slide in the tape recorder control mechanism is unlatched and a drive motor is switched off.

In these and similar interruption mechanisms the zero member is pressed against a first stop during transport of the tape by a frictional force in the slip coupling. In practice, frictional forces which act between two components which are movable relative to each other are never constant, but exhibit fluctuations. Owing to the mutual coupling of the components of the differential mechanism and the drive motor the fluctuations in friction result in speed variations which are eventually transmitted to the magnetic tape. This may give rise to undesired variations in the frequency of the signal which is reproduced or recorded. The force with which the zero member is moved in its second direction upon termination of the transport of the magnetic tape is determined by the friction in the friction coupling. This force is always small, because during transport of the magnetic tape a small frictional force is desirable, so as to avoid unnecessary loss of energy and also to avoid unnecessary variations in friction of unacceptable magnitude. The force available for switching over and/or switching off the apparatus is consequently small.

SUMMARY OF THE INVENTION

It is an object of the invention to provide an automatic stop mechanism which produces virtually no disturbing frictional force during normal transport, such as force might influence the uniform drive of a magnetic tape, and yet can produce a comparatively great force for actuation of switching-off or other control functions after the tape or other article has stopped.

According to the invention, the slip coupling is a so-called unidirectional coupling which allows slip between the primary and secondary coupling sections in one direction only. The zero member is moved in its second direction of movement when the unidirectional coupling prevents slip between the primary and secondary coupling sections in a direction opposite to the aforesaid one direction. Unidirectional couplings can readily be designed so that in the case of a relative movement of the coupling sections in the one direction of movement virtually no frictional force is exerted (apart from inevitable parasitic frictional forces), while relative movement in the other direction of movement is blocked completely, so that a greater force can be produced.

In tape recorders it is important to avoid the use of unidirectional couplings which produce undesired rattling or grinding noises. In embodiment of the invention which is very advantageous in this respect the unidirectional coupling has a blocking component which includes a catch which is movably journalled relative to one of the coupling sections and the other coupling section is provided with at least one cam which cooperates with the catch. It is easily ensured that the speed of the cam relative to the movably journalled catch is very low during transport of the magnetic tape, so that these two components only move very slowly relative to each other, and as a result very little noise is produced.

In a further preferred embodiment the primary and secondary coupling sections are coaxial; the cam being located generally along the axis, mounted on the secondary coupling section. The catch has a concave side face formed as part of a surface of a cylinder; the catch is eccentrically journalled on the primary coupling section so as to be pivotable relative thereto about a bearing axis which is parallel to the axis of the imaginary cylinder and passes through the center of mass of the catch. The eccentric journal is so located that the catch revolves about the cam, but is free to pivot in response to engagement between the cam and catch. To permit slip in one direction of relative motion between the coupling sections, the cam has an outwardly spiraling convex cam profile which engages the concave side face of the catch and thus imparts thereto an oscillating movement about the eccentric journal axis during transport of the magnetic tape. At the outward end of the spiral cam face, an inwardly extending stop face of the cam cooperates with a stop portion of the catch during standstill of the magnetic tape, thus preventing slip between the two coupling sections. By journalling the catch at the location of its mass center the catch is always balanced and has no tendency to pivot about its journal and strike other components under the influence of gravity. Undesired noises are therefore minimized. As a result, this embodiment is extremely suitable for use in portable magnetic-tape equipment, for example portable cassette recorders.

In the previously discussed second type of interruption mechanisms, known from German Offenlegungsschrift No. 2,332,475, the primary coupling section is urged against the pressure roller with the aid of a spring. As a result of this the pressure roller bearing and the bearing of the primary coupling section are subjected to a load, so that undesired additional frictional losses as well as fluctuations in the frictional forces may arise. In yet another preferred embodiment of the invention the pressure roller engages the differential mechanism through a gear transmission. By the use of a gear transmission instead of a friction transmission a substantial reduction of the pressure forces acting on the bearing arrangement of the pressure roller and the primary coupling section is possible.

According to still another embodiment of the invention the secondary coupling section of the unidirectional coupling comprises a third gear wheel which is rotatable about a third axis of rotation parallel to and spaced from the axis of rotation of the pressure roller, which third gear wheel is in engagement with a secondary gear wheel rigidly connected to the roller. The primary coupling section of the unidirectional coupling comprises a fourth gear wheel which is journalled on the secondary coupling section so as to be rotatable about said third axis of rotation. The zero member is a lever which is pivotable about a fourth axis of rotation parallel to and spaced from the third axis of rotation of the secondary coupling section, and on the lever a fifth and a sixth gear wheel are mounted, coaxially connected to each other and rotatable about a fifth axis of rotation parallel to and spaced from said fourth axis of rotation. At least during operation the fifth gear wheel continuously engages with the fourth gear wheel and the sixth gear wheel with the first gear wheel.

The invention will now be described in more detail with reference to the drawing, which relates to an embodiment of the invention.

DESCRIPTION OF THE PREFERRED EMBODIMENT

Figure 1:
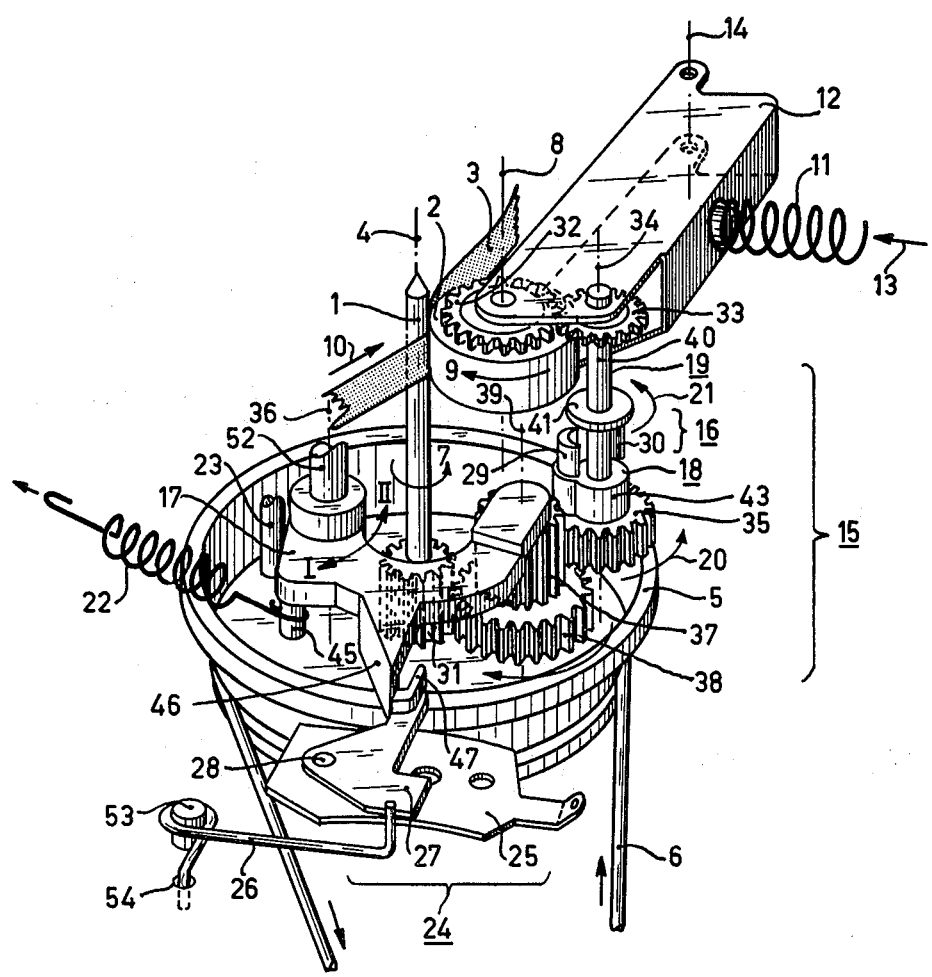
FIG. 1 is a perspective view of a stop mechanism for a tape recorder in accordance with the invention.
Figure 2:
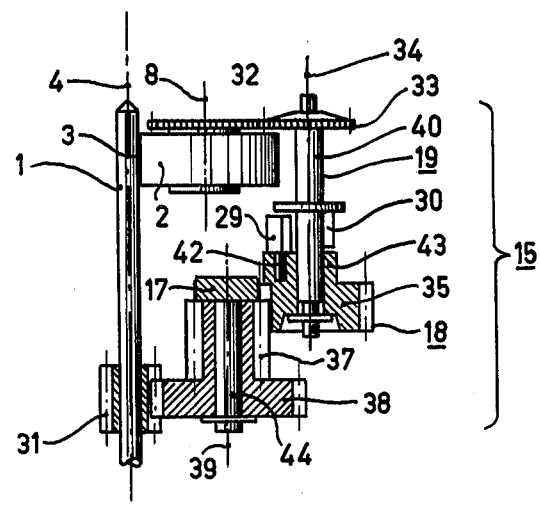
FIG. 2 is a side sectional view of the principal components of the embodiment of FIG. 1 which cooperate with each other.
Figure 3:
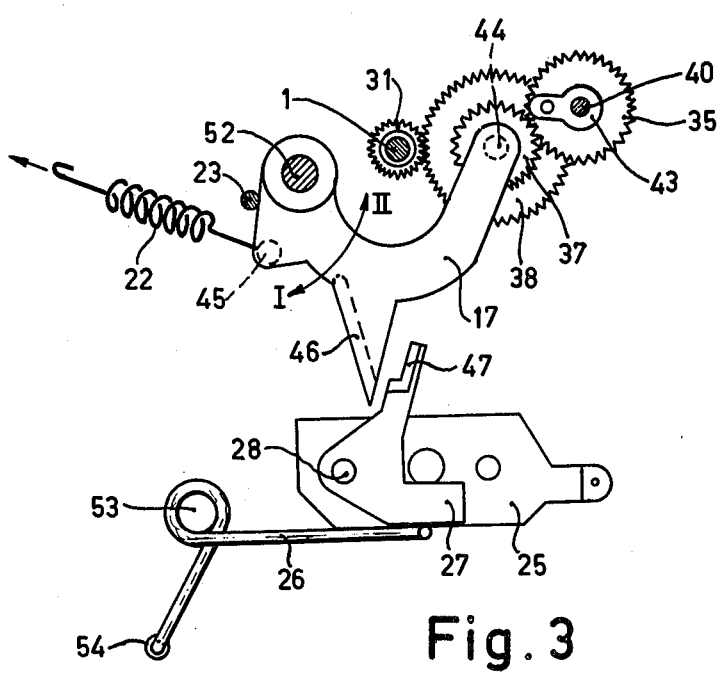
FIG. 3 is a partial plan view of the same embodiment showing the relative position of some of the components during normal operation.

The stop mechanism shown in the drawings is of the type which is based on the change in movements of a capstan 1 and a pressure roller 2 relative to each other after transport of a magnetic tape 3 has ceased. The capstan 1 is rotatable about an axis of rotation 4 and is rigidly connected to a flywheel 5 driven by a belt 6 in the direction of an arrow 7. After the magnetic tape has come to a standstill at the location of the capstan, the capstan and flywheel keep rotating for the time which is necessary to allow the drive motor (not shown) for the belt to be turned off. The pressure roller 2 is rotatable about a second axis of rotation 8 parallel to the first axis of rotation 4 of the capstan and rotates in a direction 9. The pressure roller 2 is pressed against the magnetic tape 3 by a pressure spring 11 which bears against a pressure roller lever 12 in a direction 13. The pressure roller lever 12 is pivotable about a pivoting axis 14 which is also parallel to the axis of rotation 4 of the capstan. The height of the pressure roller 2 corresponds to the width of the magnetic tape 3. In accordance with the common practice, then, the pressure roller is not motor driven but is rotated by the tape motion. When the magnetic tape 3 has come to a standstill the pressure roller 2 therefore also stops. The pressure roller is consequently a component whose stoppage may constitute a signal for the interruption mechanism that the transport of the magnetic tape has ceased locally.

The capstan 1 and the pressure roller 2 are coupled to each other through a differential mechanism identified generally by reference numeral 15. The mechanism 15 includes a slip coupling 16, a so-called zero member 17, and primary and secondary coupling sections 18 and 19 rotatable relative to each other about a common axis.

The primary coupling section 18 is driven by the capstan 1 through a gear transmission at a predetermined running speed in the direction of an arrow 20. The secondary coupling section 19 is driven by the pressure roller through a gear transmission at a normal speed higher than the running speed, in the direction of an arrow 21.

As will be explained below, the zero member 17 can be moved a limited distance in either of two opposite directions, but is pressed against a fixed stop 23 by a tension spring 22 during transport of the magnetic tape 3 and is thus subjected to a driving force in the direction I. Upon stopping of the tape the zero member is moved in the direction of movement II so that a switching system 24 is energized. This system comprises a metal switching plate 25 and switching spring 26 which contact each other during operation and close an electric circuit. Interruption of the contact between these two components by pivoting of a switching lever 27 about a pin 28 on the switching plate 25 results in interruption of the motor drive of the capstan 1.

The slip coupling 16 is a unidirectional coupling which allows slip between the primary and secondary coupling sections 18 and 19 in one direction only. The coupling 16 includes a blocking component 29 formed as a catch eccentrically journalled relative to the primary coupling section 18 as the catch revolves about a cam 30, more fully described below, formed on the secondary coupling section 19.

For driving the differential mechanism 15 a primary gear wheel 31 is rigidly mounted on the capstan 4, and a secondary gear wheel 32 is similarly on the pressure roller 2. The secondary coupling section 19 has a third gear wheel 33 rotatable about a third axis of rotation 34 parallel to and spaced from the axis of rotation 8 of the pressure roller 2, continuously engaging the secondary gear wheel 32. A fourth gear wheel 35 is also journalled on the secondary coupling section 19, rotatable about the same said third axis of rotation 34, and functions as the primary coupling section.

The zero member 17 is formed as a lever pivoted for limited angular motion about a fourth axis of rotation 36 parallel to and spaced from the third axis of rotation 34 of the secondary coupling section 19. On the lever 17 a fifth and a sixth gear wheel 37 and 38 respectively are journalled on a pin 44, the gears being rigidly connected to each other coaxially about a fifth axis of rotation 39 parallel to and spaced from the fourth axis of rotation 36. The fifth gear wheel 37 continuously engages the fourth gear wheel 35 and the sixth gear wheel 38 continuously the first gear wheel 31, at least during operation.

Practically all components of the interruption mechanism are preferably made of a plastic material. The gear wheel 32 is molded intregally with a plastic hub and a bearing pin (not shown), a rubber ring being fitted on the hub to form the roller 2. The secondary coupling section 19 is made as one molding, including the gear wheel 33, a spindle 40, a flange 41 and a cam 30. The gear wheel 35 with its hub 43 is also made of a plastic and is journalled on the spindle 40. The plastic catch 29 is molded with a bearing pin 42 and journalled in the hub 43. The upper end of the spindle 40 is journalled in the pressure roller lever 12. The lower end may be journalled in a part of a head slide (not shown) on which the magnetic heads of the magnetic tape apparatus are mounted and on which the pressure roller lever 12 is also journalled. As the pressure roller lever 12 must be capable of a slight pivotal movement, of the order of 1 mm, relative to the head slide the lower end of the spindle 40 should be journalled so as to be slightly pivotable. In practice this presents no problems.

The zero member is pivotally mounted on a pin 52 which is rigidly connected to the stationary parts of the tape recorder The zero member is preferably formed as still another plastic molding, formed as a lever having a projecting pin 44 on which plastic gear wheels 37 and 38 which are integral with each other are journalled a pin 45 on which the tension spring 22 acts; and a projecting cam 46 for cooperation with a cam follower 47 on the switching lever 27.

Figure 5:
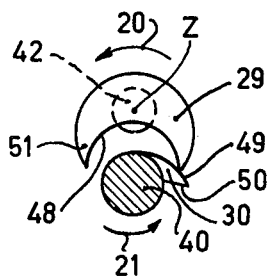
FIG. 5 is an enlarged view, partly in section of a unidirectional coupling during normal transport.
Figure 6:
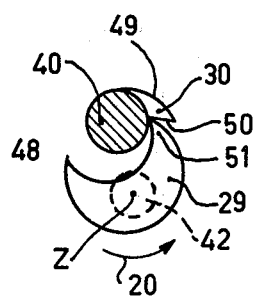
FIG. 6 is similar to FIG. 5 but shows the cooperation of the catch and the cam when magnetic-tape transport ceases.

As is clearly shown in FIGS. 5 and 6 the catch 29 has a concave cylindrical side face 48 in the form of a part of a surface of an imaginary cylinder. The catch is eccentrically journalled in the hub 35 of the primary coupling section 18 so as to be rotatable about the pin 42 on an axis which is parallel to the axis of the cylindrical surface and passes through the mass center Z of the catch. The cam 30 has a outwardly spiraling convex cam profile 49 which engages the concave side face 48 of of the catch 29 during normal transport of the magnetic tape 3 because, as will be more fully explained below, the catch revolves about the cam at a running speed less than the cam normal speed. This cooperation imparts an oscillating movement to the catch 29 about its journal 42. The cam 30 also has a hooked stop face 50 facing rearward as the cam rotates, extending inward from the outermost part of the spiral surface, which upon stoppage of the magnetic tape engages a pointed stop portion 51 at the outer end of the generally crescent-shaped catch 29. As a result slip between the two coupling sections 18 and 19 is prevented when the tape has stopped.

The operation of the interruption mechanism is as follows:

A. Transport of the magnetic tape.

The capstan 1 is driven by a motor through the belt 6. The magnetic tape 3 is pressed against the capstan by the pressure roller 2 under the influence of the pressure spring 11 and so is transportedly normally. The different gear transmissions have been selected so that the normal speed of rotation 21 of the cam 30 is slightly greater than that of the revolution 22 of the catch 29 about the cam. As is evident from FIG. 5, this means that the outwardly curved cam profile 49 of the cam 30 is entirely clear of the catch 29 during some of the time and cooperates with the concave side face 48 of the catch 29 in a slowly sliding fashion during another part of the time. As a result, the catch 29 is given a slow oscillating pivotal movement, for example one oscillation per thirty seconds. Since the frictional forces prevailing between the primary and secondary coupling sections 18 and 19 are very small, hardly any force will be exerted on the circumference of the gear wheel 37. The tension spring 22 is capable of keeping the lever 17 against the stop 23. Between the cams 46 and cam follower 47 there is a slight clearance and the switching spring 26 makes contact with the switching plate 25. The switching spring 26 has a self-resilient action and is mounted around a pin 53 on a stationary part of the frame of the magnetic tape apparatus and in an opening 54, in such a way that the spring is always loaded in the direction of the switching plate 25.

B. Standstill of the magnetic tape.

Figure 4:
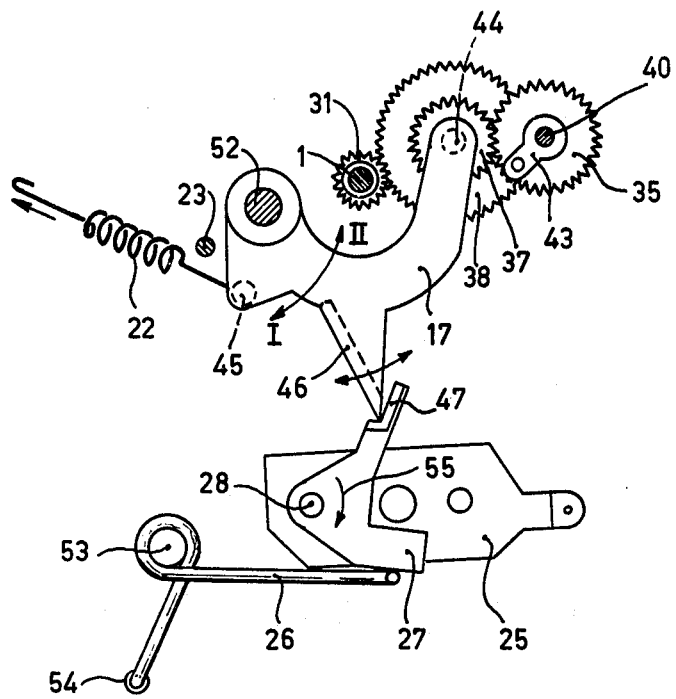
FIG. 4 is similar to FIG. 3 but showing the relative position in which the current supply to a motor is interrupted.

When the magnetic tape comes to a standstill the pressure roller 2 also comes to a standstill. This means that the secondary coupling section 19 is no longer driven, so that the cam 30 also stops. However, the revolution 22 of the catch 29 about the cam 30 continues briefly. After some time the catch 29 will be in the position relative to the cam 30 shown in FIG. 6 and the stop portion 51 of the catch will engage the stop face 50 of the cam. This prevents any further rotation of the gear wheel 35. As the gear wheel 37 is still being driven and is in engagement with the gear wheel 35 the gear wheel 37 rolls over the circumference of the gear wheel 35. Although this rolling movement is effected about the axis of rotation 36 of the lever or zero member 17, the teeth of the gear wheels 35 and 37 continuously remain in engagement with each other because of the limited travel of the zero member 17. On the circumference of the gear wheel 37 a force is exerted, so that the lever 17 is pivoted in the direction II. The cam 46 consequently comes into engagement with the cam follower 47 of the switching lever 27, so that the switching lever 27 is pivoted in a direction 55, see FIG. 4. The switching spring 26 is pressed away from the switching plate 25, and the current supply to the drive motor is interrupted. As a result of this the capstan also comes to a standstill.

In the preferred embodiment shown, the force exerted by the gear wheel 37 on the wheel 35, as can be seen in FIG. 1, exerts a torque on the pressure roller lever 12 which is counter to that exerted by the spring 11, and therefore slightly reduces the pressure of the roller on the tape. So long as sufficient torque is transmitted by the roller to the secondary coupling section to pivot the zero member, undue localized wear by rubbing of the capstan on one spot of the tape may also be eliminated because of the reduction in force between the roller and capstan.

Obviously, it is also possible to actuate a stop catch for unlatching a latching slide with the cam 46 or another component which is suitably connected the lever 17, in a similar way as in the previously discussed German Offenlegungsschrift No. 2,332,475. Thus, it is possible to switch off the magnetic tape apparatus, while the head slide is withdrawn simultaneously and, as the case may be, any depressed actuating buttons are reset. Instead of switching off a drive motor it is alternatively possible to actuate a change-over system, so that the direction of rotation of the capstan 1 is reversed and transport of the magnetic tape 3 is obtained in a direction opposite to the direction of transport 10 indicated in FIG. 1. Of course, it is also possible to initiate, other switching or control actions.

What is claimed is:

1. A stop mechanism for an apparatus having means for driving an article along a path, said mechanism comprising:
    a differential mechanism comprising a slip coupling, a primary coupling section, a secondary coupling section, and a zero member;
    means for mounting and rotationally urging the primary coupling section during operation of the apparatus independent of local interruption of article movement;
    means for mounting and rotationally driving the secondary coupling section responsive to local movement of the article;

means for mounting and connecting the zero member for urging the zero member in first and second opposite directions responsive to the relative difference in rotational speeds of said primary and secondary coupling sections; and means for performing a control function responsive to movement of the zero member in the second direction;

wherein the slip coupling is a uni-directional coupling interconnecting said primary and secondary coupling sections and permitting relative slip between said sections in one direction only, upon local interruption of article movement said slip coupling preventing relative speed difference between one of said sections and the other section, while continued rotational urging against the primary coupling section moves the zero member in the second direction.

2. A mechanism as claimed in claim 1, wherein said unidirectional coupling comprises a cam having a stop face, said cam rotating about a given axis responsive to rotation of one of said sections, and a catch eccentrically journalled about said axis, said catch being revolved about said axis responsive to rotation of the other section.

3. A mechanism as claimed in claim 2, wherein said catch has a concave side face at a side facing the given axis, the catch being eccentrically journalled through its center of mass; and the cam has a convex profile spiraling outwardly to the stop face, during a relative slip between said sections in said one direction only the convex profile engaging said concave side face to impart an oscillating pivotal movement to said catch about the eccentric journal; upon relative rotation between said sections in a direction opposite to said one direction, the stop face engaging the catch so as to prevent further relative rotation in said opposite direction.

4. A mechanism as claimed in claim 1, wherein said primary coupling section comprises a wheel mounted for rotation about a given coupling wheel axis;

said secondary coupling comprises a wheel mounted for rotation about said given axis;

said means for mounting and rotationally driving the secondary coupling comprises means for rotating the secondary coupling wheel at a normal speed responsive to normal movement of the article and stopping rotation of the secondary coupling wheel in response to local interruption of article movement;

said means for mounting and rotationally urging the primary coupling section includes means for coupling the primary coupling wheel to said article driving means for rotation at a running speed having a fixed speed ratio compared with the article driving means while the secondary coupling wheel is rotating at a normal speed responsive to normal article movement, said normal speed being greater than said running speed; and said zero member is so connected mechanically to said means for mounting and rotationally urging that, in response to stopping of rotation of said primary coupling wheel responsive to stoppage of rotation of the secondary coupling wheel, continued urging by said means for mounting and rotationally urging causes said zero member to move in the second direction.

5. A mechanism as claimed in claim 1, wherein said apparatus is a tape recorder, and said article driving means comprises a capstan for driving a tape and a pressure roller for pressing tape into engagement with the capstan, said primary coupling section comprises a wheel mounted for rotation about a given coupling wheel axis;

said secondary coupling section comprises a wheel mounted for rotation about said given axis;

said means for mounting and rotationally driving the secondary coupling includes means for coupling the secondary coupling wheel to the pressure roller for rotation at a fixed speed ratio compared with the pressure roller speed; and said means for mounting and rotationally urging the primary coupling section includes means for coupling the primary coupling wheel to the capstan for rotation at a running speed having a fixed speed ratio compared with the capstan speed while the secondary coupling wheel is rotating at a normal speed responsive to normal movement of tape between the capstan and pressure roller, said normal speed being greater than said running speed.

6. A mechanism as claimed in claim 5, wherein said slip coupling comprises a catch member revolving about said given axis at the speed of one of said wheels, and a driving member revolving about said given axis at the speed of the other of said wheels, said driving member engaging said catch so as to permit relative motion in one direction only.

7. A mechanism as claimed in claim 5, wherein said means for coupling the primary coupling and said means for coupling the secondary coupling are each gear transmissions, and said wheels are each gear wheels.

8. A mechanism as claimed in claim 5, wherein the zero member is mounted for pivoting about a fixed axis; said means for mounting and rotationally urging the primary coupling section comprises a wheel driven rotationally about a fixed axis by the capstan; at least one wheel mounted on the zero member for rotation about an axis parallel to said fixed axis, engaging the wheel driven by the capstan, and engaging the primary coupling wheel for driving the primary coupling wheel while the secondary coupling wheel is rotating at a normal speed, reduction of speed of the secondary coupling wheel below the running speed causing said primary coupling wheel speed to be reduced to that of secondary coupling wheel, thereby causing said zero member to pivot in said second direction; means for biassing said zero member pivotally in said first direction; and stop means for preventing pivoting of said zero member in said first direction beyond a given position.

9. A mechanism as claimed in claim 8, wherein said capstan rotates an axis parallel to and spaced from said fixed axis; and said wheel driven rotationally by the capstan, said at least one wheel, and said primary coupling wheel are all gear wheels.

10. A mechanism as claimed in claim 8, wherein
said apparatus includes a pressure roller support member on which said pressure roller is rotationally mounted, and means for biasing said support member toward the capstan;

said secondary coupling wheel is mounted for rotation on said support member, said given axis moving with said support member; and said at least one wheel rotates in such direction, and is so disposed with respect to said primary coupling wheel, that reaction force, when the secondary coupling wheel speed drops below the running speed because of local interruption of tape movement, urges the support member in a direction opposed to said means for biasing such that roller pressure pressing tape against the capstan is reduced.

* * * * *